US010914953B1

(12) United States Patent
Lam et al.

(10) Patent No.: US 10,914,953 B1
(45) Date of Patent: Feb. 9, 2021

(54) VARIFOCAL WAVEGUIDE DISPLAY USING TUNABLE LENS

(71) Applicant: Facebook Technologies, LLC, Menlo Park, CA (US)

(72) Inventors: Wai Sze Tiffany Lam, Redmond, WA (US); Yijing Fu, Redmond, WA (US); Lu Lu, Seattle, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 204 days.

(21) Appl. No.: 16/005,561

(22) Filed: Jun. 11, 2018

(51) Int. Cl.
*G02B 27/01* (2006.01)
*F21V 8/00* (2006.01)
*G06T 19/00* (2011.01)
*G09G 3/00* (2006.01)
*H04N 13/332* (2018.01)

(52) U.S. Cl.
CPC ......... *G02B 27/0172* (2013.01); *G02B 6/003* (2013.01); *G02B 6/005* (2013.01); *G02B 6/0026* (2013.01); *G02B 6/0028* (2013.01); *G02B 2027/0123* (2013.01); *G02B 2027/0178* (2013.01); *G06T 19/006* (2013.01); *G09G 3/001* (2013.01); *H04N 13/332* (2018.05)

(58) Field of Classification Search
CPC .............. G02B 27/0172; G02B 6/0026; G02B 6/0028; G02B 6/003; G02B 6/005; G02B 2027/0123; G02B 2027/0178; H04N 13/332; G06T 19/006; G09G 3/001
See application file for complete search history.

(56) References Cited

U.S. PATENT DOCUMENTS

| | | | | |
|---|---|---|---|---|
| 2004/0196665 A1* | 10/2004 | Travis | ................. | H04N 9/3141 362/558 |
| 2012/0320100 A1* | 12/2012 | Machida | .............. | G02B 27/017 345/690 |
| 2014/0140654 A1* | 5/2014 | Brown | ..................... | G02F 1/29 385/10 |
| 2017/0235143 A1* | 8/2017 | Chi | ...................... | G02B 26/101 359/204.2 |
| 2017/0236463 A1* | 8/2017 | Chi | .................... | G02B 27/0172 345/694 |
| 2019/0346918 A1* | 11/2019 | Akkaya | ............. | G02B 27/0075 |

OTHER PUBLICATIONS

Ren, H. et al., "Tunable-Focus Cylindrical Liquid Crystal Lens," Japanese Journal of Applied Physics, Feb. 10, 2004, pp. 652-653, vol. 43, Part 1, No. 2.

(Continued)

*Primary Examiner* — George G King
(74) *Attorney, Agent, or Firm* — Fenwick & West LLP (57) ABSTRACT

A tunable waveguide display includes a source waveguide, a first tunable lens (FTL), an output waveguide, and a second tunable lens (STL). The source waveguide receives light, expands the light in a first dimension, and outputs the expanded light. The FTL adjusts a wavefront of the expanded light to form adjusted light. The output waveguide receives the adjusted light, expands the adjusted light in a second dimension to form image light, and outputs the image light. The STL adjusts a wavefront of the image light. The FTL and the STL control an image plane of the image light.

21 Claims, 6 Drawing Sheets

(56) References Cited

OTHER PUBLICATIONS

He, Z. et al., "Cylindrical Liquid Crystal Lens and Its Applications in Optical Pattern Correlation Systems," Japanese Journal of Applied Physics, May 1995, pp. 2392-2395, vol. 34, Part 1, No. 5A.

Lu, L. et al., "Surface Localized Polymer Aligned Liquid Crystal Lens," Optics Express, Mar. 25, 2013, pp. 7133-7138, vol. 21, No. 6.

He, Z. et al., "Cylindrical Liquid Pattern Crystal Lens and Its Applications in Optical Pattern Correlation Systems," Japanese Journal of Applied Physics, 1995, vol. 34, pp. 2392-2395.

Lin, Y.H. et al., "Tunable-Focus Cylindrical Liquid Crystal Lenses," Japanese Journal of Applied Physics, 2005, vol. 44, No. 1A, pp. 243-244.

Ren, H. et al., "Tunable-Focus Cylindrical Liquid Crystal Lens," Japanese Journal of Applied Physics, 2004, vol. 43, No. 2, pp. 652-653.

\* cited by examiner

VARIFOCAL WAVEGUIDE DISPLAY USING TUNABLE LENS

BACKGROUND

The disclosure relates generally to near-eye-display systems, and more specifically to varifocal waveguide displays using tunable lenses.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems are typically designed to adjust a position of a focal plane of the image light for ease of use. However, designing a conventional NED to have a variable position of the focal plane can result in a relatively bulky and heavy NED due to the relatively large number and size of optical components (e.g. lenses, mirrors, etc.).

SUMMARY

A waveguide display is used for presenting media to a user. The waveguide display includes a source waveguide, a first tunable lens, an output waveguide, and a second tunable lens. The source waveguide includes an entrance area and an exit area. The source waveguide is configured to receive light at the entrance area, expand (e.g., via pupil replication) the light in a first dimension, and output the expanded light from the exit area. The first tunable lens has a first range of optical powers in the first dimension. The first tunable lens adjusts a wavefront of the expanded light to form adjusted light. The output waveguide includes an input area and an output area. The output waveguide is configured to receive the adjusted light emitted from the source waveguide at the input area, expand (e.g., via pupil replication) the adjusted light in a second dimension to form image light and output the image light using the output area. The second tunable lens has a second range of optical powers in the second dimension. The second tunable lens adjusts a wavefront of the image light. The first tunable lens and the second tunable lens control a location of an image plane of the image light.

In some configurations, the waveguide display includes a controller that generates and provides display instructions to the source waveguide, and the output waveguide. In some embodiments, the waveguide display is integrated into a frame as part of a near-eye display. The user of the near-eye display wears the frame. In some configurations, the waveguide display includes a controller that generates display instructions and provides the display instructions to the source waveguide, and the output waveguide.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A waveguide display is used for presenting media to a user. In some embodiments, the waveguide display is incorporated into an artificial reality system. The waveguide display, includes a source waveguide, a first tunable lens, an output waveguide, and a second tunable lens. The source waveguide is configured to receive light (e.g., from a source assembly), expand the light in a first dimension, and output the expanded light. Expansion of light by the optical system may occur in one or more dimensions.

The first tunable lens is a lens with a tunable focal length. The first tunable lens has a first range of optical powers in the first dimension. For example, the first tunable lens may function as Fresnel cylindrical lens. In some configurations, the first tunable lens applies a first optical power, of the first range of optical powers, to adjust a wavefront of the expanded light to form adjusted light. The first optical power may be a zero optical power, a positive optical power, and a negative optical power.

The output waveguide receives the adjusted light emitted from the source waveguide, expands the adjusted light in a second dimension to form image light, and outputs the image light to an eyebox. In some embodiments, expansion of the image light is due to pupil (e.g., of a source assembly) replication at the eyebox, where a pupil is replicated in the eyebox in one or more dimensions. This expansion may occur over multiple dimensions, accordingly, light from a small pupil (e.g., 2×2 mm) can be expanded to fill a much larger eye box (e.g., 40×40 mm) which can increase ease of use for a user.

The second tunable lens has a second range of optical powers in the second dimension. In some configurations, the second tunable lens applies a second optical power, of the second range of optical powers, to adjust a wavefront of the image light. The second optical power may be a zero optical power, a positive optical power, and a negative optical power. The first optical power in the first dimension and the second optical power in the second dimension control a location of an image plane of the image light.

Note that the first tunable lens and the second tunable lens facilitate the waveguide display controlling a location of an image plane of the image light presented to the user's eyes. While conventional waveguide displays use an additional optical systems to adjust the location of the image plane, these additional optical systems often involve bulky optical components (e.g. lenses and mirrors) and/or other moving components that add to the complexity and form factor of such waveguide displays. In contrast, the waveguide display described herein utilizes one or more electronically tunable lenses (e.g. liquid crystal based lenses) that adjust the location of the image plane of the image light, and avoids the use of any physically moving components.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
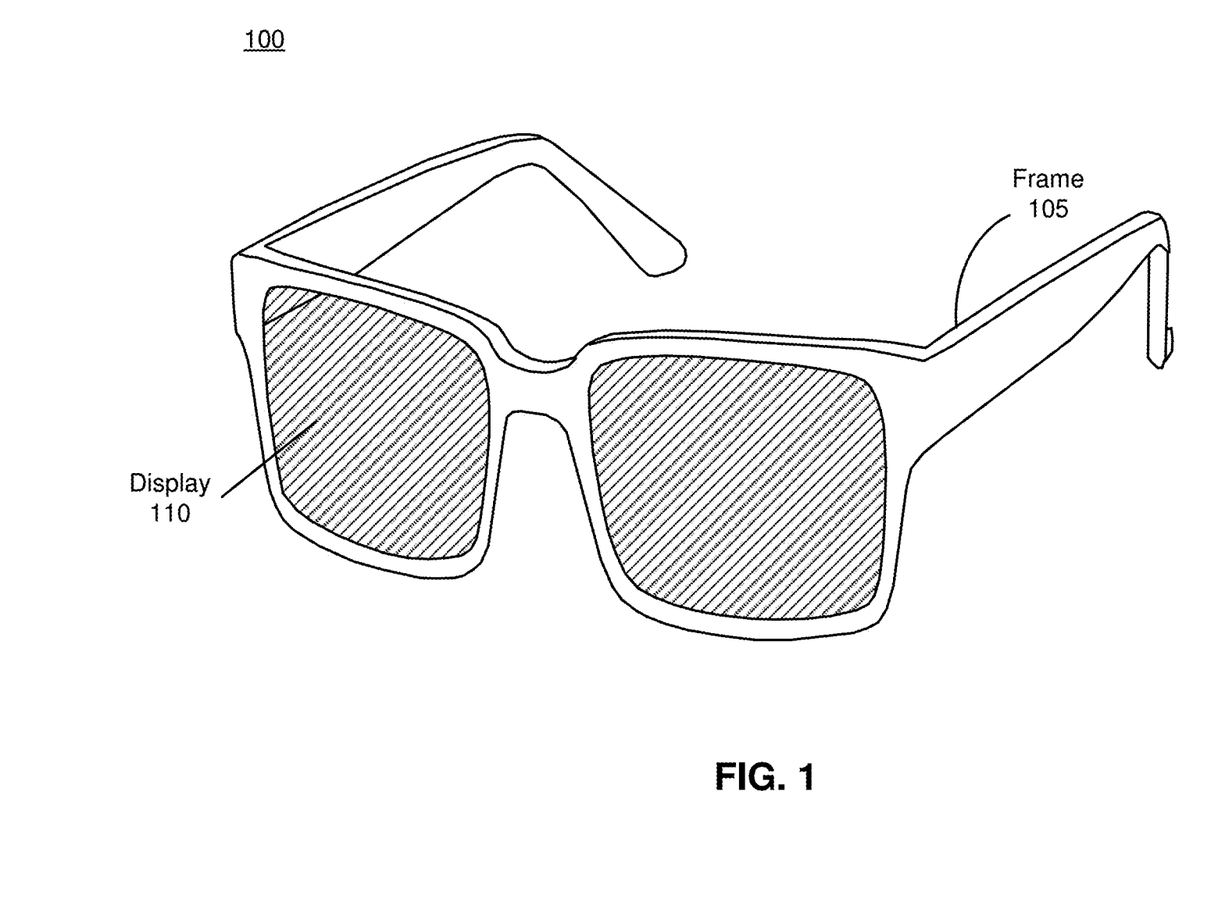
FIG. 1 is a diagram of a NED, in accordance with one or more embodiments.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. However, in some embodiments, the NED 100 may be modified to also operate as a virtual reality (VR) NED, an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes, e.g., a tunable waveguide display. The tunable waveguide display is a display including optical waveguides with one or more tunable lenses that can adjust a location of an image plane at which image light is presented to a user.

Figure 2:
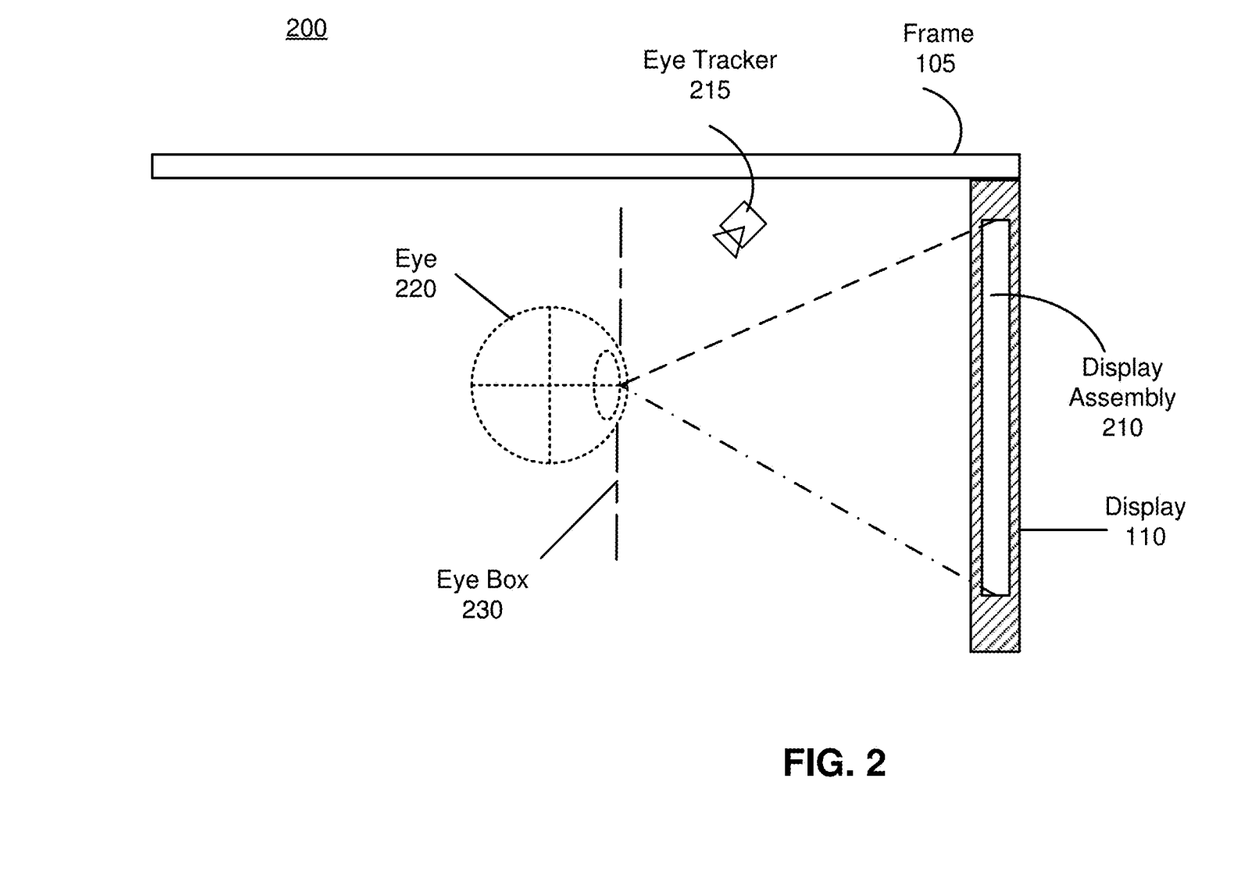
FIG. 2 is a cross-section of the NED illustrated in FIG. 1, in accordance with one or more embodiments.

FIG. 2 is a cross-section 200 of the NED 100 illustrated in FIG. 1, in accordance with an embodiment. The display 110 includes at least one display assembly 210 and an eye tracker 225. An eye box 230 is a location where the eye 220 is positioned when the user wears the NED 100. For purposes of illustration, FIG. 2 shows the cross section 200 associated with a single eye 220 and a single display assembly 210, but in alternative embodiments not shown, another waveguide display assembly which is separate from the waveguide display assembly 210 shown in FIG. 2, provides image light to another eye 220 of the user.

The display assembly 210, as illustrated below in FIG. 2, is configured to direct the image light to the eye 220 through the eye box 230. The display assembly 210 includes at least one tunable waveguide display. Operation of a tunable waveguide display is discussed in detail below with regard to FIGS. 3-5B. In some embodiments, the display assembly 210 may include one or more optical elements. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, liquid lens, liquid crystal lens, a convex lens, a concave lens, a filter, or any other suitable optical element that affects image light.

The eye tracker 215 determines eye tracking information for the user's eye 220. The eye tracking information may comprise information about a position and an orientation of the user's eye 220 in the eye-box 230, i.e., information about location of a pupil of the eye 220 and information about a gaze vector of the user's eye 220. The eye tracker 215 may include a source assembly that includes a light source (not shown in FIG. 2) emitting light toward the eye box 230 and an imaging device or camera (not shown in FIG. 2) that captures light reflected from one or more surfaces of the user's eye 220. In one embodiment, the user's eye 220 is illuminated with structured light. In this case, the eye tracker 215 may determine a position of the user's eye 220 and a gaze vector of the user's eye 220 based on distortions in a captured image of a pattern of the structured light reflected from at least one surface of the user's eye 220. In another embodiment, the eye tracker 215 determines eye position and a gaze vector of the user's eye 220 based on magnitudes of light reflected from at least one surface of the user's eye 220 that are captured over a defined period of time.

Figure 3:
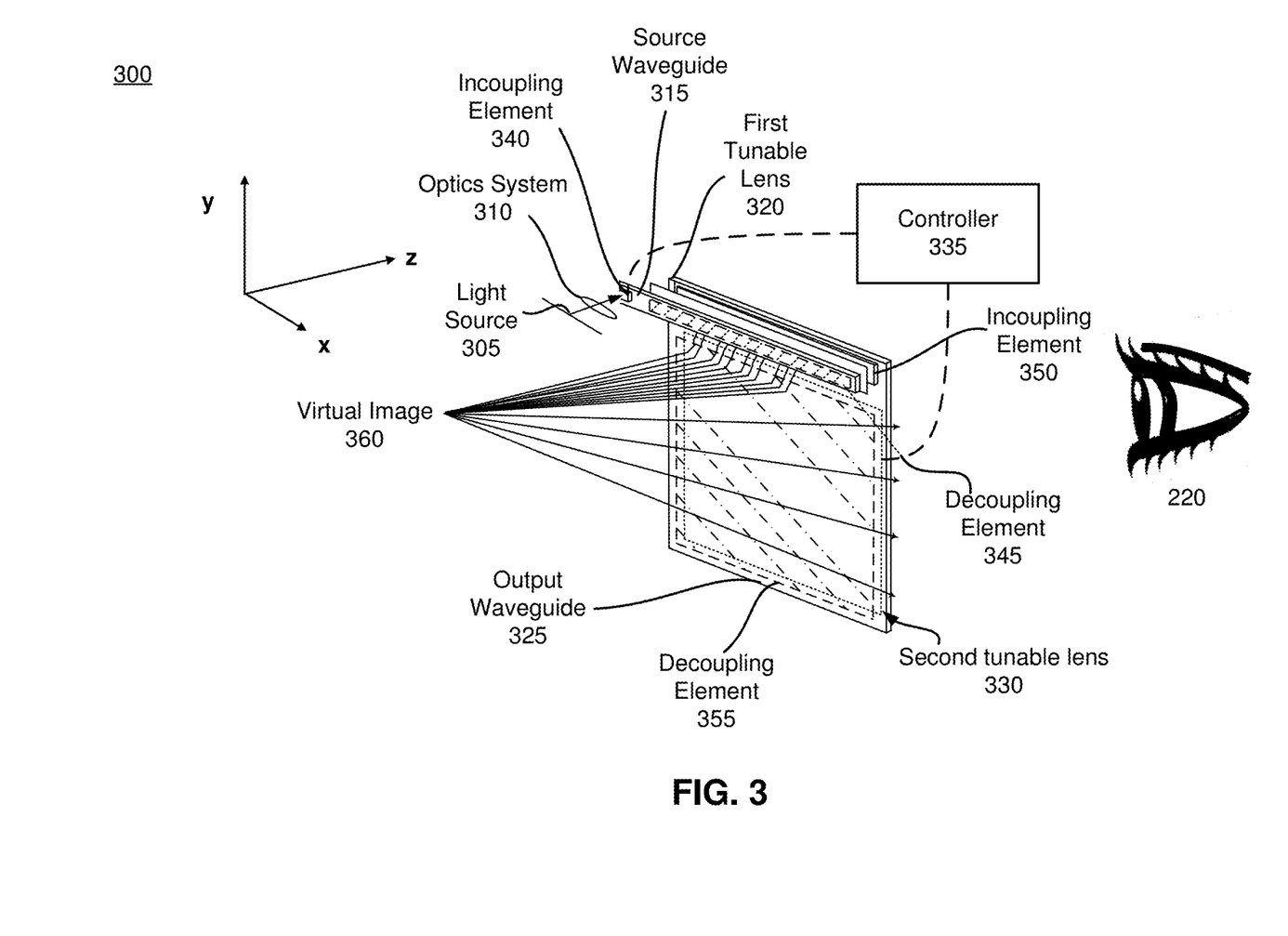
FIG. 3 illustrates an isometric view of a tunable waveguide display, in accordance with one or more embodiments.

FIG. 3 illustrates an isometric view of a tunable waveguide display 300, in accordance with one or more embodiments. The tunable waveguide display 300 includes a light source 305, an optics system 310, a source waveguide 315, a first tunable lens 320, an output waveguide 325, and a second tunable lens 330, and a controller 335. The light source 305 and the optics system 310 are collectively referred to as a source assembly. In some embodiments, the tunable waveguide display 300 is a component (e.g., display assembly 210) of the NED 100. In alternate embodiments, the tunable waveguide display 300 is part of some other NED, or other system that directs display image light to a particular location. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye. As discussed in detail below, the waveguide display 300 can dynamically control a location of an image plane (i.e., the location of a virtual image 360) by adjusting the optical powers of the first tunable lens 320 and the second tunable lens 330.

The light source 305 is a source of light that generates at least a coherent or partially coherent image light. The light source 305 may be, e.g., a laser diode, a microLED, a vertical cavity surface emitting laser, a light emitting diode, a tunable laser, or some other light source that emits coherent or partially coherent light. The light source 305 emits light in a visible band (e.g., from about 390 nm to 700 nm), and it may emit light that is continuous or pulsed. In some embodiments, the light source 305 may be a laser that emits light at a particular wavelength (e.g., 532 nanometers).

The optics system 310 includes one or more optical components that condition the light from the light source 305. Conditioning light from the light source may include, e.g., expanding, collimating, adjusting orientation in accordance with instructions from the controller 335, some other adjustment of the light, or some combination thereof. The one or more optical components may include, e.g., lenses, mirrors, apertures, gratings, or some combination thereof. As noted above, the optics system 310 and the light source 305 make up the source assembly that has an associated pupil.

The source waveguide 315 is an optical waveguide configured to expand light in at least one dimension. The source waveguide 315 incouples the conditioned light at an incoupling element 340. The incoupling element 340 incouples the conditioned light into the source waveguide 315. The source waveguide 315 receives the conditioned light emitted from the optics system 310 and expands (e.g., via pupil replication) the received light along the x-dimension. In some embodiments, the source waveguide 315 may also expand the conditioned light in other directions (e.g., in the y-dimension). The expanded light is outcoupled from the source waveguide 315 via a decoupling element 345. While a single coupling element 340 and decoupling element 345 are shown in FIG. 3, in other embodiments, there may be one or more coupling elements and/or decoupling elements. The coupling element 340 may be, e.g., a diffraction grating, a holographic grating, some other element that couples the conditioned light into the source waveguide 315, or some combination thereof. And the decoupling element 345 may be, e.g., a diffraction grating, a holographic grating, some other element that outcouples the expanded light from the source waveguide 315, or some combination thereof.

The source waveguide 315 may be composed of one or more materials that facilitate total internal reflection of image light. The source waveguide 315 may be composed of e.g., silicon, plastic, glass, polymers, or some combination thereof. The source waveguide 315 has a relatively small form factor. For example, the source waveguide 315 may be approximately 50 mm long along x-dimension, 3 mm wide along y-dimension, and 0.3-1 mm thick along z-dimension. In some embodiments, the waveguide display 300 includes a plurality of source waveguides with each source waveguide outputting an image light of a specific band of optical wavelength (e.g. red, green, blue) and each of the source waveguide is vertically stacked with an offset. Further details of a stacked waveguide may be found in U.S. patent application Ser. No. 15/495,369, which is hereby incorporated by reference in its entirety.

The first tunable lens 320 acts as a tunable lens that primarily imparts optical power in at least a first dimension (i.e., the x dimension) on the expanded light received from the source waveguide 315. The first tunable lens 320 is configured to apply a first optical power, of a first range of optical powers, to adjust a wavefront of the expanded light to form adjusted light. The first tunable lens 320 selects an optical power from the first range of optical powers in accordance with display instructions received from the controller 335.

In some embodiments, the first tunable lens 320 may be separated by an air gap from the source waveguide 315. In other embodiments the first tunable lens 320 may be directly coupled to the source waveguide 315. A wavefront of the expanded light is dynamically adjusted (e.g., impart some level of divergence, convergence, or collimation) in a first dimension (e.g., the x-dimension) by the first tunable lens 320. Functionally, the first tunable lens 320 acts as a tunable cylindrical lens that primarily imparts optical power in the first dimension, but not in a second orthogonal dimension (e.g., the y-dimension). In alternate embodiments, the first tunable lens 320 may additionally impart some optical power (negative or positive) in the second dimension. The adjustment to the wavefront generally imparts some level of divergence in the first dimension, but in some embodiments, may alternatively collimate or cause the wavefront to converge.

The first tunable lens 320 is an electronically tunable lens whose optical properties can be varied based on display instructions from the controller 335, as described below in detail with reference to FIGS. 4A and 4B. The first tunable lens 320 may be composed of liquid crystals whose orientation is varied by applying an electrical bias to impart a particular optical phase profile to achieve some level of optical power along at least one dimension (i.e., the first dimension). The first tunable lens 320 has a range of optical powers that includes a plurality of negative optical powers in the first dimension. In some embodiments, the range of optical powers may also include positive optical powers or zero optical power. In alternate embodiments, the range of optical powers may also include positive, negative, or zero optical powers in the second dimension. The first tunable lens 320 directs the adjusted light to the output waveguide 325.

The output waveguide 325 expands (e.g., via pupil replication) the adjusted light to form image light. The output waveguide 325 receives the adjusted light at one or more incoupling elements 350. The incoupling element 350 incouples the adjusted light from the first tunable lens 320 into the output waveguide 325. An incoupling element may be, e.g., a diffraction grating, a holographic grating, some other element that incouples the image light into the output waveguide 325, or some combination thereof. The output waveguide 325 expands the incoupled light in at least a second (e.g., the y-dimension) that is orthogonal to the first dimension (e.g., the x-dimension) to form image light. In some embodiments, expanding the image light is caused by replication of the pupil of the source assembly across one or more dimensions. In some embodiments the replicated pupils may overlap each other. The expansion may occur over one or more dimensions (do not need to be orthogonal), and in some embodiments (like the one illustrated) the expansion occurs over two orthogonal dimensions (e.g., the x and y dimension). The replicated pupils may fill some or all of the eyebox (e.g., 10-40 mm in diameter) and allow for easier placement of the eye 220 in the eyebox to view image content (e.g., relative to optical systems with a very small exit pupil (e.g., 2-3 mm in diameter).

The output waveguide 325 may be composed of one or more materials that facilitate total internal reflection of the image light. The output waveguide 325 may be composed of e.g., silicon, plastic, glass, or polymers, or some combination thereof. The output waveguide 325 has a relatively small form factor. For example, the output waveguide 325 may be approximately 50 mm wide along x-dimension, 30 mm long along y-dimension and 0.3-1 mm thick along z-dimension.

A decoupling element 355 decouples the image light from the output waveguide 325. The decoupling element 355 may be, e.g., a diffraction grating, a holographic grating, some other element that decouples image light out of the output waveguide 325, or some combination thereof.

The second tunable lens 330 is an electronically tunable lens whose optical properties can be varied based on display instructions from the controller 335, as described below in detail with reference to FIGS. 5A and 5B. The second tunable lens 330 may be composed of liquid crystals whose orientation is varied by applying an electrical bias to impart a particular optical phase profile to achieve some level of optical power along at least one dimension (i.e., the second dimension). The second tunable lens 330 has a range of optical powers that includes a plurality of negative optical powers in the second dimension. In some embodiments, the range of optical powers may also include positive optical powers or zero optical power. In alternate embodiments, the range of optical powers may also include positive, negative, or zero optical powers in the first dimension. The light emitted from the second tunable lens 330 forms a virtual image 360 as seen by the user's eye 220. Note that optical power in the first dimension and the second optical power in the second dimension control a location of the virtual image 360 (i.e., control an image plane of the image light). Accordingly, the wavefront display 300 is able to vary the location of the virtual image 360 by tuning the optical power in the first dimension for the first tunable lens 320 and the optical power in the second dimension for the second tunable lens 330.

Functionally, the second tunable lens 330 acts as a tunable cylindrical lens that primarily imparts optical power in the second dimension, but not in the first dimension (e.g., the x-dimension). In alternate embodiments, the second tunable lens 330 may additionally impart some optical power (negative or positive) in the first dimension. A wavefront of the image light is dynamically adjusted (e.g., impart some level of divergence, convergence, or collimation) by the second tunable lens 330 in the second dimension (e.g., the y-dimension).

In some embodiments, the second tunable lens 330 may be separated by an air gap from a waveguide body of the output waveguide 325. In other embodiments the second tunable lens 330 may be directly coupled to the waveguide body.

The controller 335 controls the display operations of the tunable waveguide display 300. The controller 335 determines display instructions for the first tunable lens 320 and the second tunable lens 330. In some embodiments, display instructions may simply be an image file (e.g., bitmap). The display instructions may be received from, e.g., a console of an artificial reality system (e.g., as described below in conjunction with FIG. 6). Display instructions are instructions used by the tunable waveguide display 300 to generate image light presented to user's eye 220. The display instructions may include, e.g., a type of a source of image light (e.g., monochromatic, polychromatic), a scanning rate, a target optical power of the first tunable lens 320 (e.g., a target optical phase profile), and a target optical power of the second tunable lens 330 (e.g., a target optical phase profile), or some combination thereof. The controller 335 provides the display instructions to the first tunable lens 320, the second tunable lens 330, the light source 305, or some combination thereof. The controller 335 can dynamically control a location of the image plane occupied by the virtual image 360 by adjusting the optical powers of the first tunable lens 320 and the second tunable lens 330.

Figure 4A:
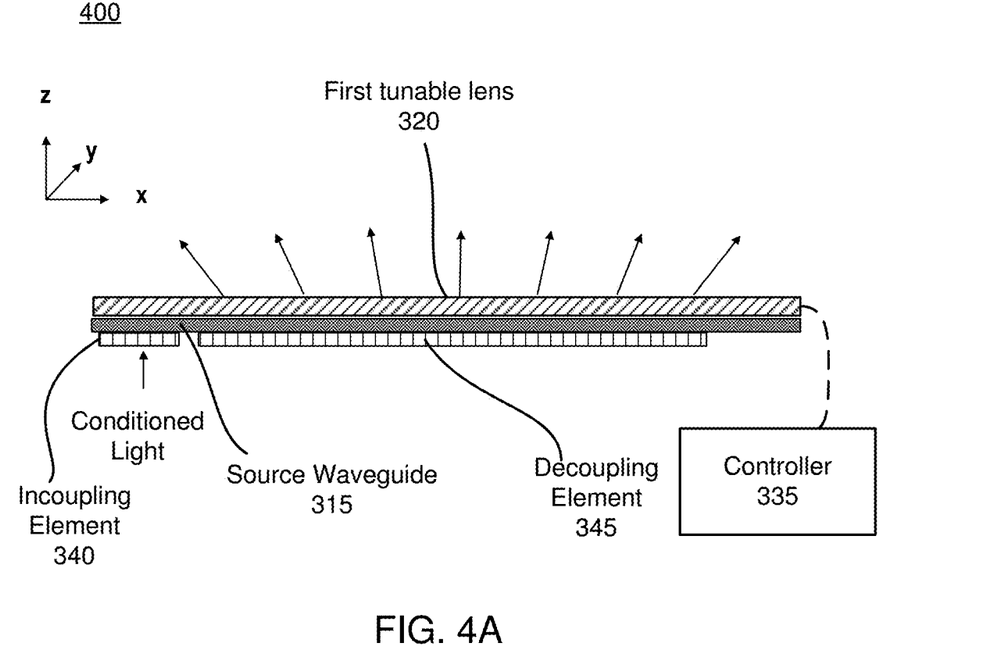
FIG. 4A illustrates a cross-section of a portion of the tunable waveguide display of FIG. 3, in accordance with one or more embodiments.

FIG. 4A illustrates a cross-section 400 of a portion of the tunable waveguide display 300 of FIG. 3, in accordance with one or more embodiments. The illustrated portion of the tunable waveguide display 300 includes the incoupling element 340, the source waveguide 315, the decoupling element 345, the first tunable lens 320, and the controller 335.

The first tunable lens 320 is an optical element that directs a beam of light. The first tunable lens 320 is an electronically tunable lens composed of liquid crystals. As shown in FIG. 4A, the controller 335 provides display instructions to the first tunable lens 320 to adjust orientations of the liquid crystals. The orientations of the liquid crystals impart a particular optical phase profile to achieve some level of optical power along at least one dimension (i.e., the x-dimension). For example, the optical phase profile may be that of a Fresnel lens that substantially applies optical power along one dimension (e.g., like a cylindrical lens). Accordingly, the first tunable lens 320 functions as a tunable cylindrical lens with an optical power within a range of optical powers. For example, the range of optical powers may include −0.5 to −3 diopter. In some embodiments, the range of optical powers may also include positive optical powers or zero optical power. In alternate embodiments, the range of optical powers may also include positive, negative, zero optical powers, or some combination thereof in a second dimension that is orthogonal to the x-dimension (e.g., the y-dimension).

In the example of FIG. 4A, the first tunable lens 320 is coupled to a portion of the source waveguide 315. In alternate embodiments, the first tunable lens 320 is separated from the source waveguide 315 by an air gap.

Figure 4B:
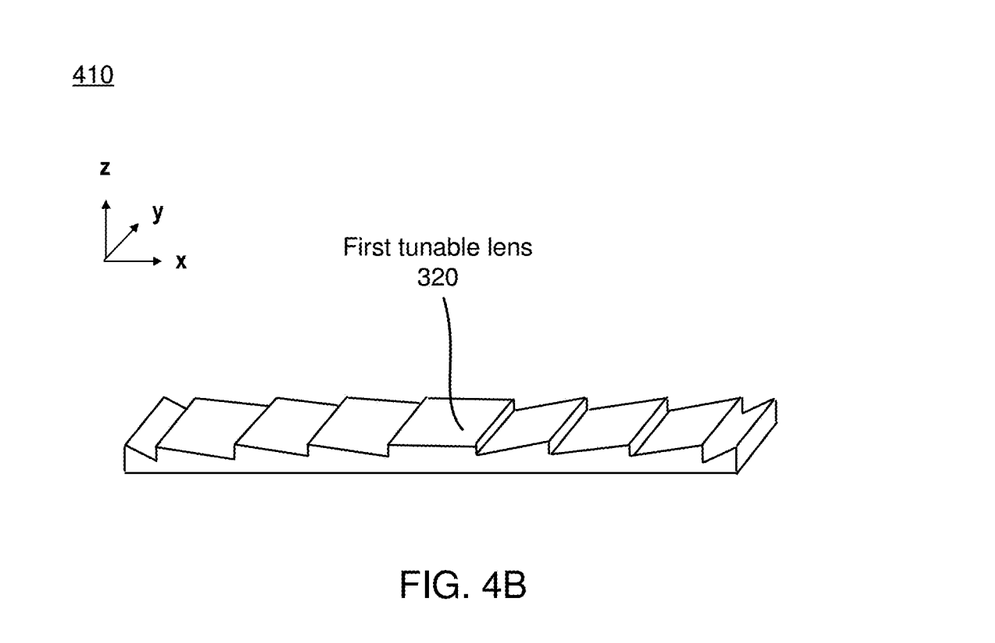
FIG. 4B is an isometric view of a functional representation of a first tunable lens of FIG. 4A, in accordance with one or more embodiments.

FIG. 4B is an isometric view of a functional representation 410 of the first tunable lens 320 of FIG. 4A, in accordance with one or more embodiments. In the illustrated embodiment, the first tunable lens 320 has a phase profile of a cylindrical Fresnel lens, such that it provides optical power along the x-dimension but not the y-dimension.

Figure 5A:
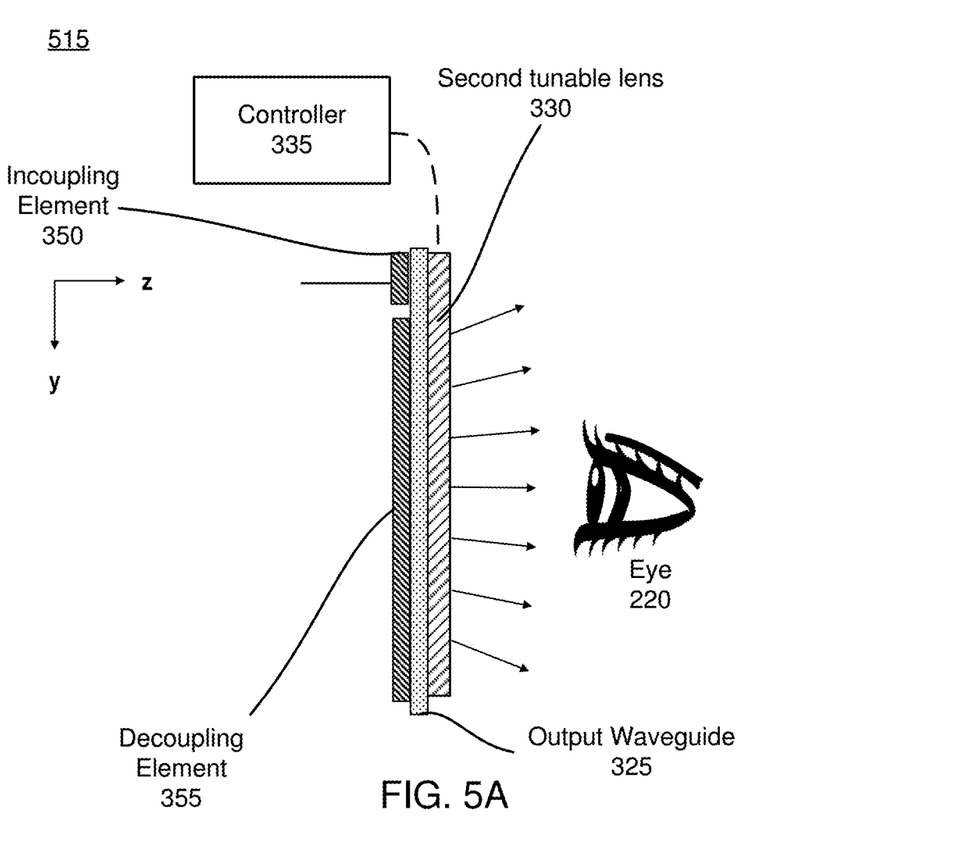
FIG. 5A illustrates a cross-section of a different portion of the tunable waveguide display of FIG. 3, in accordance with one or more embodiments.

FIG. 5A illustrates a cross-section 515 of a different portion of the tunable waveguide display 300 of FIG. 3, in accordance with one or more embodiments. The illustrated portion of the tunable waveguide display 300 includes the incoupling element 350, the output waveguide 325, the decoupling element 355, the second tunable lens 330, and the controller 335.

The second tunable lens 330 is an optical element that directs a beam of light. As shown in FIG. 5B, the controller 335 provides display instructions to the second tunable lens 330 to adjust the orientation of the liquid crystals in order to control the location of image plane in the image light outputted by the output waveguide 325.

The controller 335 generates display instructions to the second tunable lens 330 to apply an electrical voltage signal to the liquid crystals inside the second tunable lens 330. In response to the applied electrical voltage, the second tunable lens 330 adjusts a focal length of the second tunable lens 330. As the second tunable lens 330 primarily applies optical power in a dimension (i.e., the y dimension) that is orthogonal to the dimension the first tunable lens 320 applies optical power, the controller is able to dynamically control a location of an image plane by adjusting the respective optical powers of the first tunable lens 320 and the second tunable lens 330.

In the example of FIG. 5A, the second tunable lens 330 is coupled to a portion of the output waveguide 325. In alternate embodiments, the second tunable lens 330 is separated from the output waveguide 325 by an air gap.

Figure 5B:
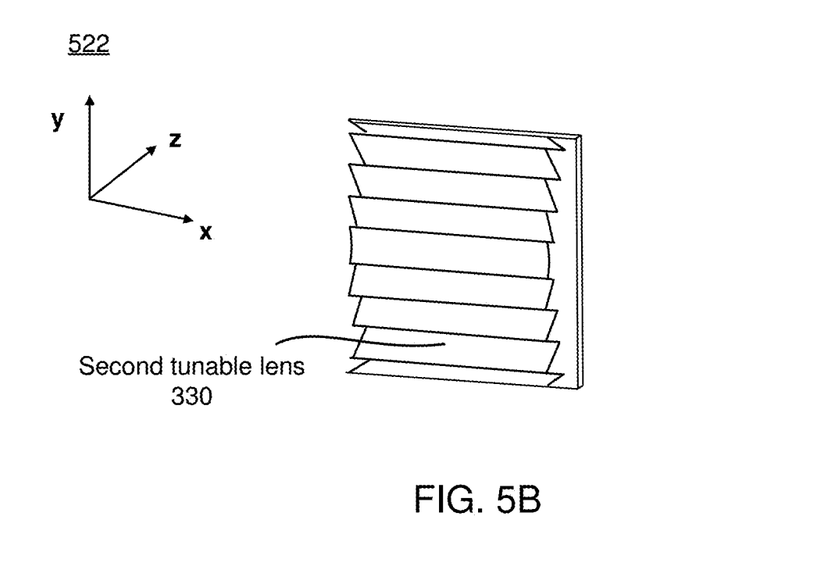
FIG. 5B is an isometric view of a functional representation of the second tunable lens 30 of FIG. 5B, in accordance with one or more embodiments

FIG. 5B is an isometric view of a functional representation 522 of the second tunable lens 330 of FIG. 5B, in accordance with one or more embodiments. In the illustrated embodiment, the second tunable lens 330 has a phase profile of a cylindrical Fresnel lens, such that it provides optical power along the y-dimension but not the x-dimension.

Figure 6:
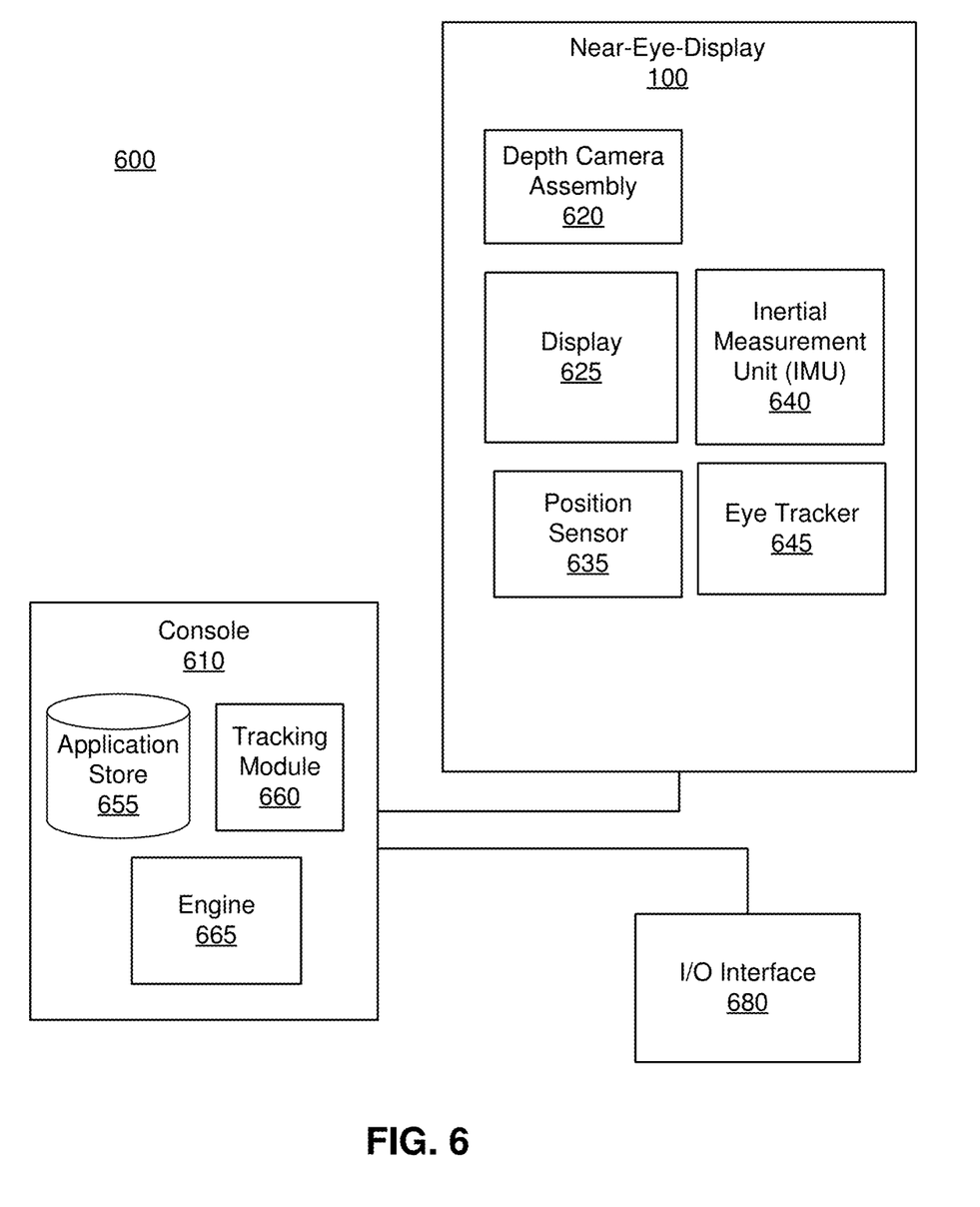
FIG. 6 is a block diagram of a system including the NED, in accordance with one or more embodiments.

FIG. 6 is a block diagram of a system 600 including the NED 100, according to an embodiment. The system 600 shown by FIG. 6 comprises the NED 100, and an I/O interface 680 that are each coupled to the console 610. While FIG. 6 shows an example system 600 including one NED 100 and one I/O interface 615, in other embodiments, any number of these components may be included in the system 600. For example, there may be multiple NEDs 100 each having an associated I/O interface 615, with each NED 100 and I/O interface 615 communicating with the console 610. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the NED 100.

The NED 100 is a near-eye display that presents media to a user. Examples of media presented by the NED 100 include one or more images, video, audio, or some combination thereof. In some embodiments, audio is presented via an external device (e.g., speakers and/or headphones) that receives audio information from the NED 100, the console 610, or both, and presents audio data based on the audio information. In some embodiments, the NED 100 may also act as an AR eye-wear glass. In these embodiments, the NED 100 augments views of a physical, real-world environment with computer-generated elements (e.g., images, video, sound, etc.).

The NED 100 includes a DCA 620, a display 625, one or more position sensors 635, an IMU 640, and an eye tracker 645. Some embodiments of the NED 100 have different components than those described in conjunction with FIG. 6. Additionally, the functionality provided by various components described in conjunction with FIG. 6 may be differently distributed among the components of the NED 100 in other embodiments.

The DCA 620 captures data describing depth information of a local area surrounding some or all of the NED 100. The DCA 620 can compute the depth information using the data (e.g., based on a captured portion of a structured light pattern), or the DCA 620 can send this information to another device such as the console 610 that can determine the depth information using the data from the DCA 620.

The display 625 includes one or more of the tunable waveguide assemblies 310. Details for various embodiments of the waveguide display assembly element are discussed in detail with reference to FIGS. 3 and 5B. The display 625 can control a location of an image plane of image light emitted from the display 625 using, e.g., two or more tunable lenses. The display 625 may adjust the location of the image plane based on eye tracking information provided by the eye tracker 645. In this manner, the display 625 may mitigate vergence-accommodation conflict.

The IMU 640 is an electronic device that generates data indicating a position of the NED 100 based on measurement signals received from one or more of the position sensors 635 and from depth information received from the DCA 620. A position sensor 635 generates one or more measurement signals in response to motion of the NED 100. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the NED 100 relative to an initial position of the NED 100. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the NED 100 from the sampled data. For example, the IMU 640 integrates the measurement signals received from the accelerometers over time to estimate a velocity vector and integrates the velocity vector over time to determine an estimated current position of a reference point on the NED 100. Alternatively, the IMU 640 provides the sampled measurement signals to the console 610, which interprets the data to reduce error. The reference point is a point that may be used to describe the position of the NED 100. The reference point may generally be defined as a point in space or a position related to the NED 100's orientation and position.

The IMU 640 receives one or more parameters from the console 610. The one or more parameters are used to maintain tracking of the NED 100. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the NED 100, the IMU 640 may be a dedicated hardware component. In other embodiments, the IMU 640 may be a software component implemented in one or more processors.

The eye tracker 645 determines eye tracking information associated with an eye of a user wearing the NED 100. The eye tracking information determined by the eye tracker 645 may comprise information about an orientation of the user's eye, i.e., information a gaze location that corresponds to a foveal region of the user's eye. In some embodiments, the eye tracker 645 is integrated into the optical assembly 630. An embodiment of the eye tracker 645 may comprise an illumination source and an imaging device (camera). The eye tracker 645 is configured to track the gaze location corresponding to the foveal region of a user's eye. The eye tracker 645 may provide information about the tracked gaze location to the varifocal module 650. The eye tracker 645 may be an embodiment of the eye tracker 225 of the NED 100, as described above with reference to FIG. 2.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the NED 100 for processing in accordance with information received from one or more of: the DCA 620, the NED 100, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the NED 100 or the I/O interface 615. Examples of applications include: gaming applications, conferencing applications, video playback applications, or other suitable applications.

The tracking module 660 calibrates the system 600 using one or more calibration parameters and may adjust one or more calibration parameters to reduce error in determination of the position of the NED 100 or of the I/O interface 615. For example, the tracking module 660 communicates a calibration parameter to the DCA 620 to adjust the focus of the DCA 620 to more accurately determine positions of structured light elements captured by the DCA 620. Calibration performed by the tracking module 660 also accounts for information received from the IMU 640 in the NED 100 and/or an IMU 640 included in the I/O interface 615. Additionally, if tracking of the NED 100 is lost (e.g., the DCA 620 loses line of sight of at least a threshold number of structured light elements), the tracking module 660 may re-calibrate some or all of the system 600.

The tracking module 660 tracks movements of the NED 100 or of the I/O interface 615 using information from the DCA 620, the one or more position sensors 635, the IMU 640 or some combination thereof. For example, the tracking module 650 determines a position of a reference point of the NED 100 in a mapping of a local area based on information from the NED 100. The tracking module 660 may also determine positions of the reference point of the NED 100 or a reference point of the I/O interface 615 using data indicating a position of the NED 100 from the IMU 640 or using data indicating a position of the I/O interface 615 from an IMU 640 included in the I/O interface 615, respectively. Additionally, in some embodiments, the tracking module 660 may use portions of data indicating a position or the NED 100 from the IMU 640 as well as representations of the local area from the DCA 620 to predict a future location of the NED 100. The tracking module 660 provides the estimated or predicted future position of the NED 100 or the I/O interface 615 to the engine 665.

The engine 665 generates a 3D mapping of the area surrounding some or all of the NED 100 (i.e., the "local area") based on information received from the NED 100. In some embodiments, the engine 665 determines depth information for the 3D mapping of the local area based on information received from the DCA 620 that is relevant for techniques used in computing depth. The engine 665 may calculate depth information using one or more techniques in computing depth from structured light. In various embodiments, the engine 665 uses the depth information to, e.g., update a model of the local area, and generate content based in part on the updated model.

The engine 665 also executes applications within the system 600 and receives position information, acceleration information, velocity information, predicted future positions, or some combination thereof, of the NED 100 from the tracking module 660. Based on the received information, the engine 665 determines content to provide to the NED 100 for presentation to the user. For example, if the received information indicates that the user has looked to the left, the engine 665 generates content for the NED 100 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the NED 100 or haptic feedback via the I/O interface 615.

In some embodiments, based on the eye tracking information (e.g., orientation of the user's eye) received from the eye tracker 645, the engine 665 determines resolution of the content provided to the NED 100 for presentation to the user. The engine 665 provides the content to the NED 100 having a maximum pixel resolution on the electronic display in a foveal region of the user's gaze, whereas the engine 665 provides a lower pixel resolution in other regions of the electronic display, thus achieving less power consumption at the NED 100 and saving computing cycles of the console 610 without compromising a visual experience of the user. In some embodiments, the engine 665 can further use the eye tracking information to adjust where objects are displayed on the electronic display to mitigate vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in image light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure.

What is claimed is:

1. A waveguide display, comprising:
    a source waveguide including an entrance area and an exit area, the source waveguide configured to receive light at the entrance area, expand the light in a first dimension, and output the expanded light from the exit area;
    a first tunable lens configured to receive the expanded light output from the source waveguide and adjust a wavefront of the expanded light to form adjusted light, wherein the first tunable lens is configured to function as a cylindrical lens that imparts optical power in the first dimension but not a second dimension orthogonal to the first dimension;
    an output waveguide including an input area and an output area, the output waveguide configured to receive the adjusted light emitted from the source waveguide at the input area, expand the adjusted light in the second dimension to form image light and output the image light using the output area; and
    a second tunable lens configured to adjust a wavefront of the image light, and the first tunable lens and the second tunable lens controlling a location of an image plane of the image light, wherein the second tunable lens is configured to function as a cylindrical lens that imparts optical power in the second dimension but not the first dimension.

2. The waveguide display of claim 1, further comprising:
    a controller configured to generate and provide display instructions to at least one of the first tunable lens, and the second tunable lens.

3. The waveguide display of claim 2, wherein the first tunable lens is configured to adjust a focal position of the expanded light in accordance with the display instructions.

4. The waveguide display of claim 2, wherein the second tunable lens is configured to adjust a focal position of the image light in accordance with the display instructions.

5. The waveguide display of claim 1, wherein each of the first tunable lens and the second tunable lens are configured as Fresnel cylindrical lenses.

6. The waveguide display of claim 1, wherein the first tunable lens is configured to operate at a first optical power of a first range of optical powers in the first dimension, the second tunable lens is configured to operate at a second optical power of a second range of optical powers in the second dimension, each of the first optical power and the second optical power is at least one of: a zero optical power, a positive optical power, and a negative optical power.

7. The waveguide display of claim 6, wherein each of the first range of optical powers and the second range of optical powers span optical powers having only negative values.

8. The waveguide display of claim 1, wherein at least one of the first tunable lens and the second tunable lens is a liquid lens.

9. The waveguide display of claim 1, wherein the first tunable lens is mechanically coupled to the source waveguide.

10. The waveguide display of claim 1, wherein the second tunable lens is mechanically coupled to the output waveguide.

11. A near-eye display (NED), comprising:
    a frame configured to be worn by a user;
    a waveguide display that is integrated into the NED, the waveguide display comprising:
        a source waveguide including an entrance area and an exit area, the source waveguide configured to receive light at the entrance area, expand the light in a first dimension, and output the expanded light from the exit area;
        a first tunable lens configured to receive the expanded light output from the source waveguide and adjust a wavefront of the expanded light to form adjusted light, wherein the first tunable lens is configured to function as a cylindrical lens that imparts optical power in the first dimension but not a second dimension orthogonal to the first dimension;
        an output waveguide including an input area and an output area, the output waveguide configured to receive the adjusted light emitted from the source waveguide at the input area, expand the adjusted light in the second dimension to form image light and output the image light using the output area; and
        a second tunable lens configured to adjust a wavefront of the image light, and the first tunable lens and the second tunable lens controlling a location of an image plane of the image light, wherein the second tunable lens is configured to function as a cylindrical lens that imparts optical power in the second dimension but not the first dimension.

12. The NED of claim 11, further comprising:
    a controller configured to generate and provide display instructions to at least one of the first tunable lens, and the second tunable lens.

13. The NED of claim 12, wherein the first tunable lens is configured to adjust a focal position of the expanded light in accordance with the display instructions.

14. The NED of claim 12, wherein the second tunable lens is configured to adjust a focal position of the image light in accordance with the display instructions.

15. The NED of claim 11, wherein each of the first tunable lens and the second tunable lens are configured as Fresnel cylindrical lenses.

16. The NED of claim 11, wherein the first tunable lens is configured to operate at a first optical power of a first range of optical powers in the first dimension, the second tunable lens is configured to operate at a second optical power of a second range of optical powers in the second dimension, each of the first optical power and the second optical power is at least one of: a zero optical power, a positive optical power, and a negative optical power.

17. The NED of claim 16, wherein each of the first range of optical powers and the second range of optical powers span optical powers only having negative values.

18. The NED of claim 11, wherein at least one of the first tunable lens and the second tunable lens is a liquid lens.

19. The NED of claim 11, wherein the first tunable lens is mechanically coupled to the source waveguide.

20. The NED of claim 11, wherein the second tunable lens is mechanically coupled to the output waveguide.

21. The waveguide display of claim 1, wherein the first tunable lens is configured to operate over a first range of optical powers in the first dimension and the second tunable lens is configured to operate over a second range of optical powers in the second dimension, wherein the first range of optical powers and the second range of optical powers only include values that are less than or equal to zero.

* * * * *